US009064614B2

(12) United States Patent
Chen et al.

(10) Patent No.: US 9,064,614 B2
(45) Date of Patent: Jun. 23, 2015

(54) METHOD OF MAKING A TRANSPARENT CONDUCTIVE FILM

(75) Inventors: Zhuo Chen, Beijing (CN); Kai-Li Jiang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 808 days.

(21) Appl. No.: 13/270,245

(22) Filed: Oct. 11, 2011

(65) Prior Publication Data

US 2012/0025427 A1 Feb. 2, 2012

Related U.S. Application Data

(62) Division of application No. 12/339,341, filed on Dec. 19, 2008, now Pat. No. 8,889,217.

(30) Foreign Application Priority Data

Apr. 25, 2008 (CN) .......................... 2008 1 0066687

(51) Int. Cl.
*H01B 1/04* (2006.01)
*B32B 9/00* (2006.01)
*C08K 3/04* (2006.01)

(52) U.S. Cl.
CPC ............... *H01B 1/04* (2013.01); *Y10S 977/742* (2013.01); *Y10S 977/788* (2013.01); *Y10S 977/789* (2013.01); *Y10S 977/842* (2013.01); *Y10S 977/89* (2013.01); *Y10S 977/90* (2013.01); *Y10S 977/901* (2013.01)

(58) Field of Classification Search
CPC ............... H01B 1/04; B32B 9/00; C08K 3/04
USPC ............ 252/500–514; 427/122; 977/742, 932
See application file for complete search history.

(56) References Cited

U.S. PATENT DOCUMENTS

2005/0116336 A1* 6/2005 Chopra et al. ................ 257/720
2006/0057290 A1* 3/2006 Glatkowski ................... 427/256
2006/0274049 A1* 12/2006 Spath et al. ................... 345/173

(Continued)

FOREIGN PATENT DOCUMENTS

TW 200722368 6/2007
TW 200802508 1/2008

OTHER PUBLICATIONS

Yang et al. ("Multicomponent Interposed Carbon Nanotube Micropatterns by Region-Specific Contact Transfer and Self-Assembling." JPC B, 107, pp. 12387-12390, online Oct. 17, 2003).*

(Continued)

*Primary Examiner* — Tri V Nguyen
(74) *Attorney, Agent, or Firm* — Novak Druce Connolly Bove + Quigg LLP

(57) ABSTRACT

A method of making a transparent conductive film includes providing a carbon nanotube array and a substrate. At least one carbon nanotube film is extracted from the carbon nanotube array, and stacked on the substrate to form a carbon nanotube film structure. The carbon nanotube film structure is irradiated by a laser beam along a predetermined path to obtain a predetermined pattern. The predetermined pattern is separated from the other portions of the carbon nanotube film, thereby forming the transparent conductive film from the predetermined pattern of the carbon nanotube film.

5 Claims, 3 Drawing Sheets

(56) References Cited

U.S. PATENT DOCUMENTS

| | | | | |
|---|---|---|---|---|
| 2006/0283262 | A1 * | 12/2006 | Smits et al. | 73/799 |
| 2007/0166223 | A1 * | 7/2007 | Jiang et al. | 423/447.1 |
| 2007/0215841 | A1 * | 9/2007 | Ford et al. | 252/503 |
| 2007/0237952 | A1 | 10/2007 | Jiang et al. | |
| 2008/0191606 | A1 * | 8/2008 | Geohegan et al. | 313/501 |
| 2008/0299460 | A1 * | 12/2008 | Feng et al. | 429/231.8 |
| 2009/0239042 | A1 * | 9/2009 | Jain et al. | 428/195.1 |
| 2009/0311489 | A1 * | 12/2009 | Sheehan et al. | 428/195.1 |
| 2010/0056012 | A1 | 3/2010 | Liu et al. | |

OTHER PUBLICATIONS

Liangbing Hu et.al "Electrowetting devices with transparent single-walled carbon nanotube electrodes", AIP Applied Physics Letters(90),pp. 093124-1-093124-3,2007.

Yangxin Zhou, Liangbing Hu, George Gruner, "A method of printing carbon nanotube thin films", AIP Applied Physics Letters(88),pp. 123109-1-123109-3, 2006.

* cited by examiner

METHOD OF MAKING A TRANSPARENT CONDUCTIVE FILM

RELATED APPLICATIONS

This application is a continuation of U.S. patent application Ser. No. 12/339,341, filed on Dec. 19, 2008, entitled, "METHOD OF MAKING TRANSPARENT CONDUCTIVE FILM," which claims all benefits accruing under 35 U.S.C. §119 from China Patent Application No. 200810066687.3, filed on Apr. 25, 2008 in the China Intellectual Property Office.

BACKGROUND

1. Field of the Disclosure

The disclosure relates to a method of making a conductive film, and particularly to a method of making a transparent conductive film.

2. Description of Related Art

A transparent conductive film has a characteristic of high electrical conductivity, low electrical resistance and good light penetrability. Since Baedeker's first report of transparent conductive film in 1907, in which the transparent conductive film is prepared by thermal oxidation of sputtered Cd film, attention is paid to the research and development of the transparent conductive film. Nowadays, the transparent conductive film has been widely used in liquid crystal display (LCD), touch panel, electrochromic devices and airplane windows.

The conventional methods for forming the transparent conductive film include vacuum evaporation method and magnetron sputtering method. The drawbacks of these methods include complicated equipment, high cost and being not suitable for mass production. Furthermore, these methods need a process of high-temperature annealing, which will damage a substrate on which the transparent conductive film is formed, whereby a substrate with a low melting point cannot be used for forming the film. Thus, the conventional methods have their limitations.

The conventionally used transparent conductive film is an Indium-Tin oxide (ITO) thin film, which has a high electrical conductivity and a high transparency. Since the ITO is solid at room temperature, it can be easily etched to obtain a predetermined pattern. The method of patterning the ITO thin film is as follows. Firstly, depositing the ITO thin film on the substrate by the vacuum evaporation method or magnetron sputtering method, and then forming the ITO thin film with the pattern by ion plasma etching. The etching process for forming the predetermined pattern requires the ion plasma with a high energy, which is costly and needs a complicated equipment to carry out. Furthermore, the high energy accompanies with a high temperature, which is not suitable for the substrate with a low melting point. Additionally, since the patterning process needs using a strongly alkaline solution and HF solution to pre-treat and post-treat the ITO thin film, the process unavoidably will cause pollution to the environment.

What is needed, therefore, is a method of making a transparent conductive film which does not have the disadvantages of the conventional art.

BRIEF DESCRIPTION OF THE DRAWINGS

Many aspects of the present method of making transparent conductive film can be better understood with reference to the following drawings. The components in the drawings are not necessarily drawn to scale, the emphasis instead being placed upon clearly illustrating the principles of the present method of making transparent conductive film.

Figure 1:
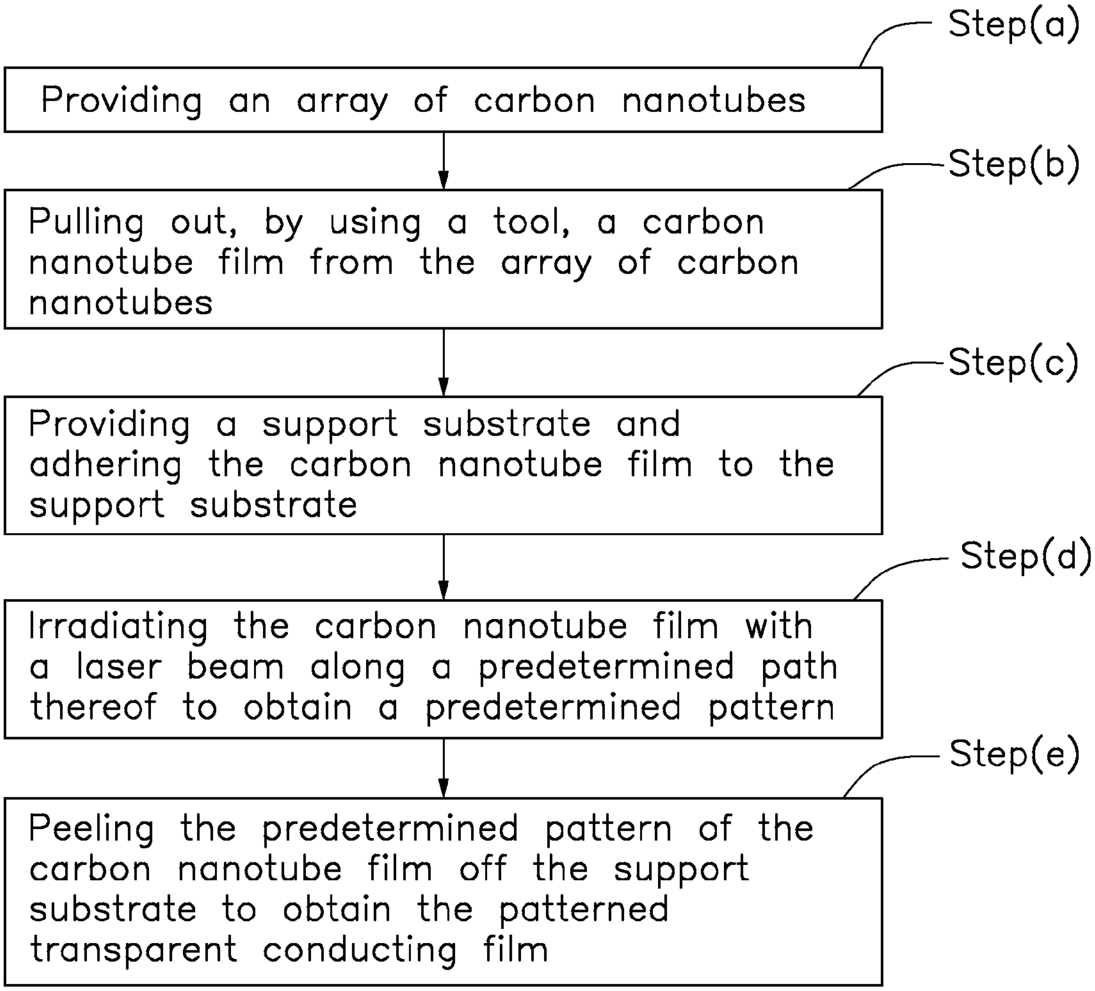
FIG. 1 is a flow chart of a method for making a transparent conductive film in accordance with an embodiment.

Corresponding reference characters indicate corresponding parts throughout the several views. The exemplifications set out herein illustrate at least one embodiment of the present method of making transparent conductive film, in one form, and such exemplifications are not to be construed as limiting the scope of the invention in any manner.

DETAILED DESCRIPTION

Reference will now be made to the drawings to describe various embodiments of the present method of making a transparent conductive film, in detail.

Referring to FIG. 1, a method for making a transparent conductive film, according to the present embodiment, comprises the steps of: (a) providing an array of carbon nanotubes (including super-aligned arrays); (b) extracting a portion of the carbon nanotubes from the array of carbon nanotubes to form a carbon nanotube film; (c) providing a support substrate and adhering the carbon nanotube film to the support substrate; (d) irradiating the carbon nanotube film with a laser beam along a predetermined path on the nanotube film thereby to cut a predetermined pattern within the path, wherein the laser beam has a power density of 10000-100000 watts per square meter and a moving speed of 800-1500 mm/s; (e) removing the predetermined pattern of the carbon nanotube film from the support substrate to obtain the required transparent conductive film.

Step (a) includes providing a substrate and forming a carbon nanotube array on the substrate. The carbon nanotube array can be a super-aligned array formed by a chemical vapor deposition method. The chemical vapor deposition method for manufacturing the carbon nanotube array generally includes the substeps of: (a1) providing a substantially flat and smooth silicon substrate with a diameter of four inches, wherein the silicon substrate can be a P-type silicon wafer, an N-type silicon wafer or a silicon wafer formed with an oxidized layer thereon. A 4-inch, P-type silicon wafer is used as the substrate; (a2) forming a catalyst layer on the substrate, wherein the catalyst layer is made of a material selected from the group consisting of iron (Fe), cobalt (Co), nickel (Ni), and an alloy thereof and then annealing the substrate with the catalyst layer in air at a temperature in a range from 700° C. to 900° C. for about 30 to 90 minutes; (a3) providing a carbon source gas at high temperature to a furnace for about 5 to 30 minutes thereby to grow a array of carbon nanotubes on the substrate, wherein the substrate has been put in the furnace which has been heated to a temperature of 400-740° C. and is filled with a protective gas. The carbon nanotube array is grown to about 200-300 micrometers high and substantially perpendicularly to the substrate. Moreover, the array of carbon nanotubes formed under the above conditions is essentially free of impurities such as carbonaceous or residual catalyst particles. The carbon nanotubes in the array are closely packed together by the van Der Waals attractive force. The carbon source gas can be, e.g., methane, ethylene, propylene, acetylene, methanol, ethanol, or a mixture thereof.

The protective gas can, preferably, be made up of at least one of nitrogen ($N_2$), ammonia ($NH_3$), and a noble gas in the present embodiment.

Step (b) includes obtaining a carbon nanotube film by extracting a portion of the carbon nanotube array therefrom by the substeps of: (b1) deciding a predetermined section of the carbon nanotube array having a determined width, and then using an adhesive tape or tool with the predetermined width to secure the end of the predetermined section of the carbon nanotube array; (b2) extracting the adhesive tape away from the carbon nanotube at an even/uniform speed to make the predetermined section of the carbon nanotube array separate from the carbon nanotube array, wherein the predetermined section forms the carbon nanotube film except the end thereof adhered to the tool. The extracting direction is, usually, substantially perpendicular to the growing direction of the carbon nanotube array.

Figure 2:
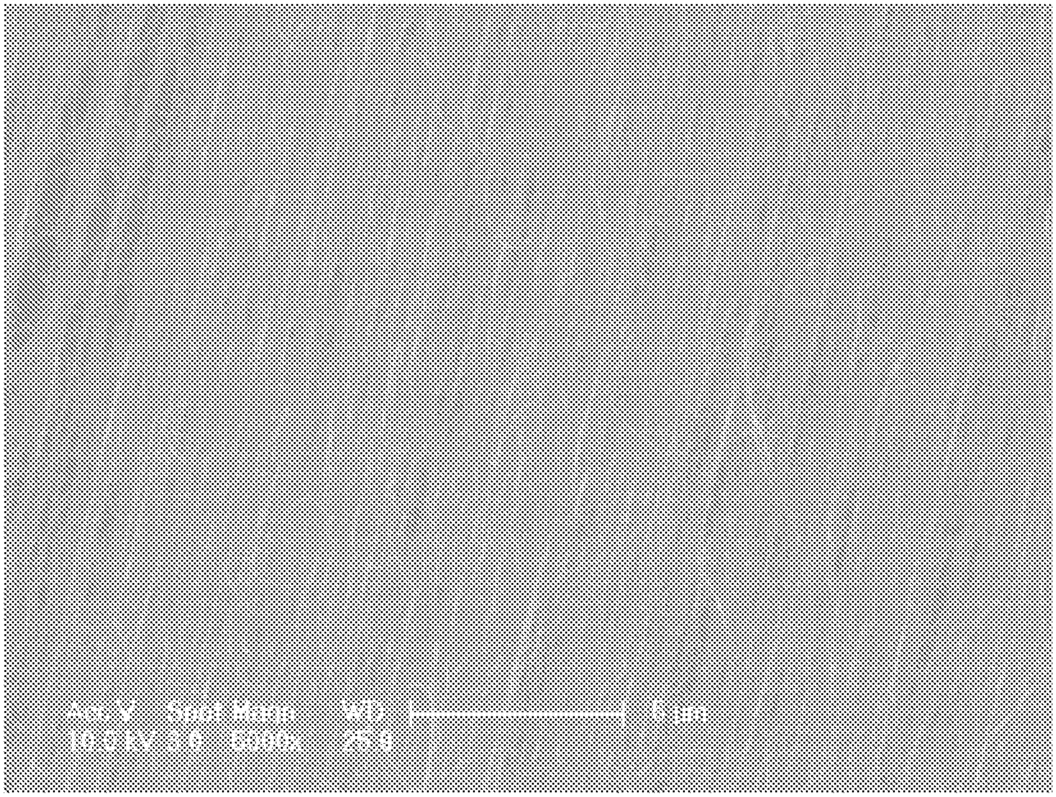
FIG. 2 shows a Scanning Electron Microscope (SEM) image of a carbon nanotube film.

Referring to FIG. 2, more specifically, during the extracting process, when the end of the predetermined section of the carbon nanotubes of the carbon nanotube array is drawn out, other carbon nanotubes of the predetermined section are also drawn out in a manner that ends of a carbon nanotube is connected with ends of adjacent carbon nanotubes, by the help of the van Der Waals attractive force between the ends of the carbon nanotubes of the predetermined section. This characteristic of the carbon nanotubes ensures that an uninterrupted carbon nanotube film can be formed. The carbon nanotubes of the carbon nanotube film are all substantially parallel to the extracting direction as seen in FIG. 2, and the carbon nanotube film produced in such manner is able to have a predetermined width.

The length and width of the carbon nanotube film depends on the size of the carbon nanotube array. The length of the carbon nanotube film can be set as desired. In the present embodiment, when the diameter of the substrate is 4-inch, the width of the carbon nanotube film is in a range from 1 centimeter to 10 centimeters, and the thickness of the carbon nanotube film is in a range from 0.01 to 100 microns.

Step (c), includes offering a support substrate on which at least one of the carbon nonotube film formed by Step (b) can be adhered thereto, to thereby form a carbon nonotube film structure. The shape and size of the support substrate is arbitrary, which could be square or rectangular transparent substrate. In the present embodiment, preferably, the support substrate is a square polyester (PET) resin having a width wider than the width of the carbon nanotube film. A plurality, for example, ten of the carbon nanotube films can be stacked on the support substrate side by side and parallel to each other. The plurality of carbon nanotube films are adhered to each other and adhered to the support substrate.

Carbon nanotubes with a high purity and a high specific surface area result in a carbon nanotube film that is adhesive. As such, in step (c), the first (bottom) carbon nanotube film adheres to the support substrate directly. Alternatively, the support substrate can be substituted by a rectangular, annular frame, and the carbon nanotube film is fixed onto the frame by an edge thereof.

The plurality of carbon nanotube films can be stacked together on the substrate and adhered together by both the van Der Waals attractive force and the adhesive nature of the films to form a stable multi-layer film combination. Additionally, a shift between orientations of carbon nanotubes of two adjacent carbon nonotube films, i.e., a discernable angle between the two adjacent carbon nanotube films, is in a range from 0° to about 90°. When the thickness of the carbon nanotube film combination increases, the transmittance of the carbon nanotube film combination will decrease accordingly. Hence, the thickness of the carbon nanotube film combination cannot be too large. In this embodiment, the thickness of the carbon nanotube film combination is in the range from 10 nanometers to 100 micrometers.

Figure 3:
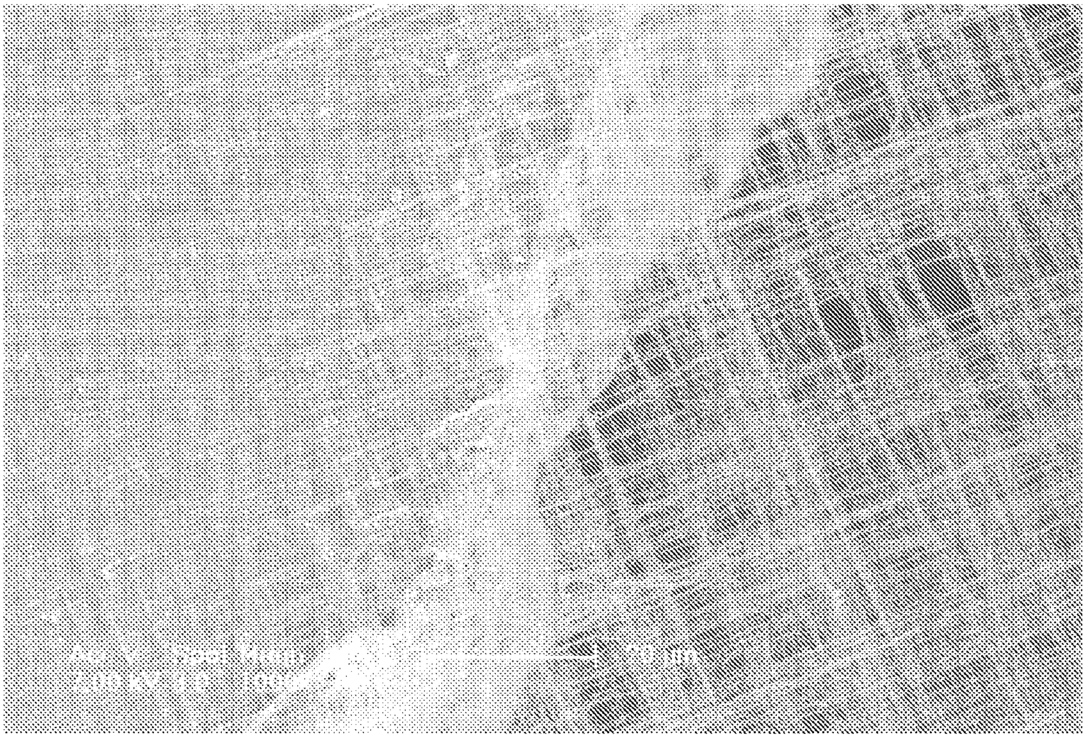
FIG. 3 shows a Scanning Electron Microscope (SEM) image of a carbon nanotube film structure obtained by stacking ten of the carbon nanotube films of FIG. 2 together.

As shown in FIG. 3, in this embodiment, a carbon nanotube film combination includes ten stacked carbon nanotube films with carbon nanotubes thereof oriented along different direction. The discernable angle between two adjacent carbon nonotube films is about 90°.

In the above-described steps, an additional step of treating the carbon nanotube film structure with an organic solution can, advantageously, be further provided after the step of stacking one or more carbon nanotube films on the support substrate. The carbon nanotube film structure can be treated with an organic solution which can be selected from the group consisting of ethanol, methanol, acetone, dichloroethane, chloroform, and combinations thereof. The carbon nanotube film structure can be treated by either of two methods: dropping the organic solution from a dropper to wet the carbon nanotube film structure or immersing the carbon nanotube film structure into a container having the organic solution therein. After being soaked by the organic solution, some of the carbon nanotubes in the carbon nanotube film will bundle together due to the action of the surface tension of the organic solution. Due to the decrease of the specific surface via the bundling, the coefficient of friction of the carbon nanotube film is reduced. In addition, the carbon nanotube film obtains a high mechanical strength and toughness. Further, due to the shrinking/contracting of the carbon nanotubes into the carbon nanotube bundles, the carbon nanotube film combination can have a more porous structure. The parallel carbon nanotube strings (e.g. the carbon nanotubes that have bundled together) in one film are spaced from each other with a larger distance, compared to the space between the carbon nanotubes prior to the organic solution treatment. The parallel carbon nanotube strings of one treated film are perpendicular to the carbon nanotube strings in an adjacent film. Micropores are thereby defined among the carbon nanotube strings. After treating the carbon nanotube film structure with an organic solution, the carbon nanotube film structure will lose specific surface area and therefore adhesiveness. The carbon nanotube film structure can be a free standing structure.

Step (d) includes using a laser beam to irradiate the carbon nanotube film combination along a predetermined portion thereof thereby to cut a predetermined pattern of the nanotube film combination. The laser beam has a power density of 10000-100000 watts per square meter and a moving speed of 800-1500 mm/s. In the present embodiment, the power density is 70000-80000 watts per square meter, and the moving speed is 1000-1200 mm/s. The laser beam will not damage the support substrate, so any suitable material can be used to form the supporting plate, according to the actual requirement.

It is to be understood, step (d) can also be carried out by fixing the laser beam and moving the carbon nanotube film structure by a computer program along the predetermined portion. All that is required is that film is exposed to the laser.

Step (e) includes, after irradiating the carbon nanotube film combination by the laser beam, immerging the carbon nanotube film structure into an organic solution, whereby the irradiated portion of the carbon nanotube film combination on the support substrate will float and separate. A required transparent conductive film is obtained on the substrate by the separated irradiated portion of the carbon nanotube film combination. The organic solution may be a volatilizable organic solution, such as ethanol, methanol, acetone, dichloroethane, chloroform, and any combination thereof.

It is to be understood that the irradiated portion of the carbon nanotube film structure can be separated from the carbon nanotube film structure by using a tool, for example, a tweezers, to peel off the irradiated portion from the carbon nanotube film structure, thereby to form the required patterned transparent conductive film. Alternatively, it can a portion of the carbon nanotube film structure surrounding the predetermined pattern removed from the carbon nanotube film structure by using a tweezers, thereby to form the required patterned transparent conductive film on the support substrate.

It is to be understood, by using the frame in place of the support substrate, predetermined pattern of the carbon nanotube film combination after being irradiated by the laser beam will be separated from the carbon nanotube film structure.

Comparing with conventional methods for making transparent conductive film, the method, in accordance with a present embodiment, of making patterned transparent conductive film has at least the following advantages. Firstly, the carbon nanotube film is extracted out from the carbon nanotube array. The substrate for forming the carbon nanotube array will not be damaged, because the process does not need a high-temperature treatment of the substrate. Secondly, the method of making a patterned transparent conductive film is easy to operate and does not need use of a strongly alkaline solution and HF solution to pre-treat and post-treat the ITO thin film, which will cause a pollution to the environment.

The predetermined pattern can be designed by a computer program. In the present embodiment, the width of the predetermined path along which the laser beam is moved can be as small as 200 nanometers or less. Using the computer program and the laser beam to obtain the predetermined pattern of the transparent conductive film combination is easy to operate and suitable for mass production Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

It is also to be understood that the above description and the claims drawn to a method may include some indication in reference to certain steps. However, the indication used is only to be viewed for identification purposes and not as a suggestion as to an order for the steps.

What is claimed is:

1. A method for making a patterned transparent conductive film, comprising:

providing an array of carbon nanotubes;

extracting at least one carbon nanotube film from the array of carbon nanotubes, wherein the at least one carbon nanotube film comprises a plurality of carbon nanotubes joined end to end by van der Waals attractive force and oriented along a same direction;

forming a carbon nanotube film structure by providing a support and adhering the at least one carbon nanotube film to the support, wherein the carbon nanotube film structure comprises a plurality of carbon nanotube films stacked with each other, and an angle is formed between the orientation directions of the carbon nanotubes in any two adjacent carbon nanotube films, and the angle is about 90 degrees;

bundling the plurality of carbon nanotubes of the carbon nanotube structure into a plurality of carbon nanotube bundles by soaking the at least one carbon nanotube film with a first organic solution, wherein the plurality of carbon nanotube bundles are formed by the shrinking and contracting of the plurality of carbon nanotubes due to the action of the surface tension of the first organic solution;

forming a predetermined pattern of the carbon nanotube film structure by irradiating the carbon nanotube film structure using a laser beam along a predetermined path, wherein the laser beam has a power density of 10000-100000 watts per square meter; and separating a portion of the carbon nanotube film structure from the support to obtain the patterned transparent conductive film, wherein the step of separating the predetermined pattern of the at least one carbon nanotube film from the carbon nanotube structure comprises immersing the carbon nanotube film structure irradiated by the laser beam into an organic solution.

2. The method as claimed in claim 1, wherein the laser beam has a power density of 70000-80000 watts per square meter.

3. The method as claimed in claim 2, wherein a relative moving speed between the laser beam and the carbon nanotube film structure is 800-1500 mm/s.

4. The method as claimed in claim 1, wherein the at least one carbon nanotube film is further treated with an organic solution.

5. The method as claimed in claim 1, wherein the organic solution comprises a material selected from the group consisting of ethanol, methanol, acetone, dichloroethane, chloroform, and any combination thereof.

* * * * *